(12) United States Patent
Moore et al.

(10) Patent No.: US 9,750,172 B2
(45) Date of Patent: Sep. 5, 2017

(54) TURF IMPLEMENT HAVING TURF SLICING REEL WITH EASILY ADJUSTABLE HEIGHT CONTROL

(71) Applicants: Jeffrey J. Moore, Beatrice, NE (US); Jeremy J. Tate, Beatrice, NE (US)

(72) Inventors: Jeffrey J. Moore, Beatrice, NE (US); Jeremy J. Tate, Beatrice, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 51 days.

(21) Appl. No.: 14/253,636

(22) Filed: Apr. 15, 2014

(65) Prior Publication Data

US 2015/0289435 A1    Oct. 15, 2015

(51) Int. Cl.
*A01B 45/02* (2006.01)
*A01B 63/00* (2006.01)

(52) U.S. Cl.
CPC .......... *A01B 45/026* (2013.01); *A01B 63/008* (2013.01)

(58) Field of Classification Search
CPC ............................ A01B 45/026; A01B 63/008
USPC ............................................. 172/19, 20, 22
See application file for complete search history.

(56) References Cited

U.S. PATENT DOCUMENTS

| 854,424 | A | | 5/1907 | Ketterer | |
|---|---|---|---|---|---|
| 2,353,345 | A | | 7/1944 | Lindskog | |
| 2,667,026 | A | * | 1/1954 | Ingram | ........................... 56/249 |
| 2,996,124 | A | * | 8/1961 | Bunting | ............................. 172/9 |
| 3,439,747 | A | * | 4/1969 | Kindlien et al. | ................. 172/21 |
| 3,777,460 | A | * | 12/1973 | Mokros | ........................... 56/16.7 |
| 4,120,136 | A | * | 10/1978 | Rose | .................... A01B 59/044 |
| | | | | | 56/15.8 |
| 4,358,965 | A | * | 11/1982 | Schroeder | .................. 74/473.23 |
| 4,901,655 | A | | 2/1990 | Magda | |
| 5,165,762 | A | | 11/1992 | Phillips | |

(Continued)

FOREIGN PATENT DOCUMENTS

| DE | 7713614 | 8/1977 |
|---|---|---|
| DE | 3347942 | 10/1985 |

(Continued)

OTHER PUBLICATIONS

Lawn Solutions Commercial Products, Inc., Turf Revitalizer Operator's Manual, 2011, Depth Control Lever on pp. 8-9.

(Continued)

*Primary Examiner* — Robert Pezzuto
*Assistant Examiner* — Jessica H Lutz
(74) *Attorney, Agent, or Firm* — James W. Miller (57) ABSTRACT

A turf implement has a frame that carries a rotatable turf slicing reel. A height adjustment lever pivots in opposite directions on the frame to raise and lower the slicing reel relative to the turf. A slot on the frame has a plurality of spaced notches. The adjustment lever carries a pin that is received in the slot and in any one of the notches to provide a desired adjusted position for the slicing reel height. A clamp is provided having a quick release locking lever that is selectively rotated between a locked position in which the clamp is in a tightly compressed condition relative to the frame to hold the adjustment lever in the desired adjusted position and an unlocked position in which the clamp is in a loosely expanded condition to permit the adjustment lever to be moved to change the desired adjusted position.

19 Claims, 4 Drawing Sheets

(56) References Cited

U.S. PATENT DOCUMENTS

| | | | |
|---|---|---|---|
| 5,479,852 A * | 1/1996 | Lloyd | 108/146 |
| 7,441,392 B2 * | 10/2008 | Lilliestielke | A01D 34/74 56/15.2 |
| 7,481,278 B1 * | 1/2009 | Pomedli | A01C 5/064 111/167 |
| 7,581,503 B2 * | 9/2009 | Martin et al. | 111/167 |
| 7,716,773 B1 | 5/2010 | Pahl et al. | |
| 2006/0070747 A1 | 4/2006 | Isaman et al. | |
| 2007/0209468 A1 | 9/2007 | Yu | |
| 2011/0126502 A1 * | 6/2011 | Pitman et al. | 56/10.8 |

FOREIGN PATENT DOCUMENTS

| | | |
|---|---|---|
| GB | 219210 | 7/1924 |
| GB | 1032915 | 6/1966 |
| GB | 1089843 | 11/1967 |
| GB | 1232142 | 5/1971 |
| JP | 50-81846 | 7/1975 |

OTHER PUBLICATIONS

Lawn Solutions Commercial Products, Inc., Turf Revitalizer Service Parts Manual, undated but admitted prior art, Items 1-7, top of p. 5.

Deere Adjusting Gauge Wheel Instructions, Apr. 2006.

\* cited by examiner

TURF IMPLEMENT HAVING TURF SLICING REEL WITH EASILY ADJUSTABLE HEIGHT CONTROL

TECHNICAL FIELD

This invention relates to turf implements having a rotatable turf slicing reel for cutting narrow slits into the turf.

BACKGROUND OF THE INVENTION

Various implements are known in the turf industry for renovating, improving or maintaining a turf surface, such as a lawn, the fairways or greens of golf courses, or any other expanse of ground that has been planted in grass. These implements are variously referred to in the industry as "slicer seeders", as "aerators", as "scarifiers", as "dethatchers", or as "verticutters". A common characteristic of these implements is the use of a rotatable slicing reel that is rotated about a substantially horizontal axis of rotation. The slicing reel carries a plurality of laterally spaced, vertically disposed cutting members that are used for cutting or slicing into a soil layer of the turf to create narrow slits in the turf or for pulling, tearing or otherwise acting on a thatch layer of the turf to in a process known as dethatching. As used in this application, the term "turf" is intended to mean "grass and the soil that is under it including the layer of dead or decomposing plant matter known as thatch that accumulates on top of the soil around the bottoms of the blades of grass".

In operating such implements, there is a need to be able to adjust the height of the slicing reel relative to the turf to control how slicing reel acts on the turf. In some cases, such as in removing or breaking up the layer of thatch that is often found in the turf, it is desirable that the lowermost portions of the orbits of the cutting members on the slicing reel be located above the soil but low enough to pass beneath the tops of the stalks of grass to enter the thatch layer to a desired depth. In other cases, it is desirable to actually enter the soil to create narrow slits in the structure of the soil, often for the simple purpose of aerating the soil but sometimes for the more complicated purpose of adding fertilizer, topdressing material, grass seeds, or the like into the soil for improving or maintaining the health of the turf. In these latter cases, the slicing reel must be lowered still further relative to the soil until the lowermost portions of the orbits of the cutting members are beneath ground level to enter into the soil to some desired depth. The height of the slicing reel will also require adjustment as the cutting members wear down.

Various ways of adjusting the height of the turf slicing reel are known in the art. One way is to raise and lower the entire implement using height adjustable wheels on the frame of the implement to thereby raise and lower the slicing reel relative to the frame. Another way is to use wheels on the frame that are not adjustable in height, but to raise and lower the slicing reel itself relative to the frame. Regardless of which way is used, it is desirable that the mechanism for effecting the height adjustment be simple in construction, durable, quick, and easy for the operator to use.

In a slicer seeder previously manufactured and sold by Lawn Solutions, Inc., a pivotal height adjustment lever was used by an operator to rotate an auxiliary shaft that was coupled to the shaft of the slicing reel by a pair of yoke arms. Rotation of the auxiliary shaft in opposite directions vertically lifted and lowered the shaft of the slicing reel relative to the frame of the implement to lift and lower the slicing reel relative to the turf. The lever could be held in a pivotally adjusted position by a spring loaded pin carried on the lever. The free end of the pin could be received in any one of a series of height adjustment holes provided on the frame of the implement. However, this mechanism did not tightly hold the parts in place which allowed for excessive vibration, wear, and noise.

SUMMARY OF THE INVENTION

One aspect of this invention relates to a turf implement which comprises a frame supported for movement over the turf. A rotatable slicing reel is carried on the frame for rotation about a substantially horizontal axis of rotation. The slicing reel has a plurality of laterally spaced cutting members which rotate in substantially vertical cutting planes to slice into the turf for creating slits in a soil layer of the turf or for engaging with and acting on a thatch layer of the turf for dethatching. A height adjustment mechanism is provided for adjusting the height of the slicing reel relative to the turf. The height adjustment mechanism comprises an adjustment member movably carried on the frame, the adjustment member being selectively movable in a first direction on the frame for lifting the slicing reel relative to the turf and being selectively movable in a second opposite direction on the frame for lowering the slicing reel relative to the turf. The height adjustment mechanism further comprises a slot on one of the frame or the adjustment member. The height adjustment mechanism additionally includes a pin carried on the other of the frame or the adjustment member with the pin projecting into the slot. Selective movement of the adjustment member relative to the frame selectively adjusts the height of the slicing reel relative to the turf and changes the location of the pin along the slot. Finally, the height adjustment mechanism also has a clamp carried with the pin for retaining the adjustment member in a desired position relative to the frame corresponding to a desired height of the slicing reel relative to the turf. The clamp includes a selectively rotatable cam operatively connected to the pin for moving the pin substantially perpendicularly relative to the slot when the cam is rotated. The cam when selectively rotated in a first direction moves the pin in a first direction relative to the slot that loosens the clamp sufficiently to permit the adjustment member to be moved relative to the frame. The cam when selectively rotated in a second opposite direction moves the pin in an opposite second direction relative to the slot that tightens the clamp sufficiently to prevent the adjustment member from being moved relative to the frame.

Another aspect of this invention relates to a turf implement which comprises a frame that carries a rotatable turf slicing reel. A height adjustment member moves in opposite directions on the frame to raise and lower the slicing reel relative to the turf. A slot on one of the frame or the adjustment member has a plurality of spaced notches. A pin is carried on the other of the frame or the adjustment member with the pin being received in the slot and in any one of the notches to provide a desired adjusted position for the slicing reel height. A clamp has a quick release locking lever that is selectively rotated between a locked position in which the clamp is in a tightly compressed condition to hold the adjustment member in the desired adjusted position and an unlocked position in which the clamp is in a loosely expanded condition to permit the adjustment member to be moved to change the desired adjusted position. The locking lever is movable between the locked and unlocked positions thereof by rotating the locking lever through an arc that is less than 360°.

Yet another aspect of this invention relates to a turf implement which comprises a frame that carries a rotatable turf slicing reel. A height adjustment member moves in opposite directions on the frame to raise and lower the slicing reel relative to the turf. A slot is provided on one of the frame or the adjustment member. The slot has a first set of a plurality of notches that are spaced along one edge of the slot to provide a first plurality of adjusted positions for the height of the slicing reel. The slot has a second set of a plurality of notches spaced along a second edge of the slot that is opposite to the first edge of the slot, the notches in the second set being offset from the notches in the first set to provide a second plurality of adjusted positions for the height of the slicing reel that are between the adjusted positions for the height of the slicing reel that are provided by the notches in the first set to thereby increase the number of possible adjusted positions. A pin is carried on the other of the frame or the adjustment member with the pin being received in the slot and in any one of the notches to provide a desired adjusted position for the slicing reel height. The slot is wide enough to accommodate the pin for substantially free sliding motion within the slot with the pin and the slot being displaceable relative to one another in a first direction to move the pin at least partially out of the slot and into a desired notch in the first set of notches and with the pin and the slot being displaceable relative to one another in a second opposite direction relative to the slot to move the pin at least partially out of the slot and into a desired notch in the second set of notches. Finally, a clamp coacts between the frame and the adjustment member with the clamp having a tightly compressed condition to hold the adjustment member in position corresponding to a desired adjusted position of the slicing reel height and an unlocked position in which the clamp is in a loosely expanded condition to permit the adjustment member to be moved to change the desired adjusted position of the slicing reel height.

BRIEF DESCRIPTION OF THE DRAWINGS

This invention will be described more fully in the following Detailed Description, when taken in conjunction with the following drawings, in which like reference numerals refer to like elements throughout.

DETAILED DESCRIPTION

Figure 1:
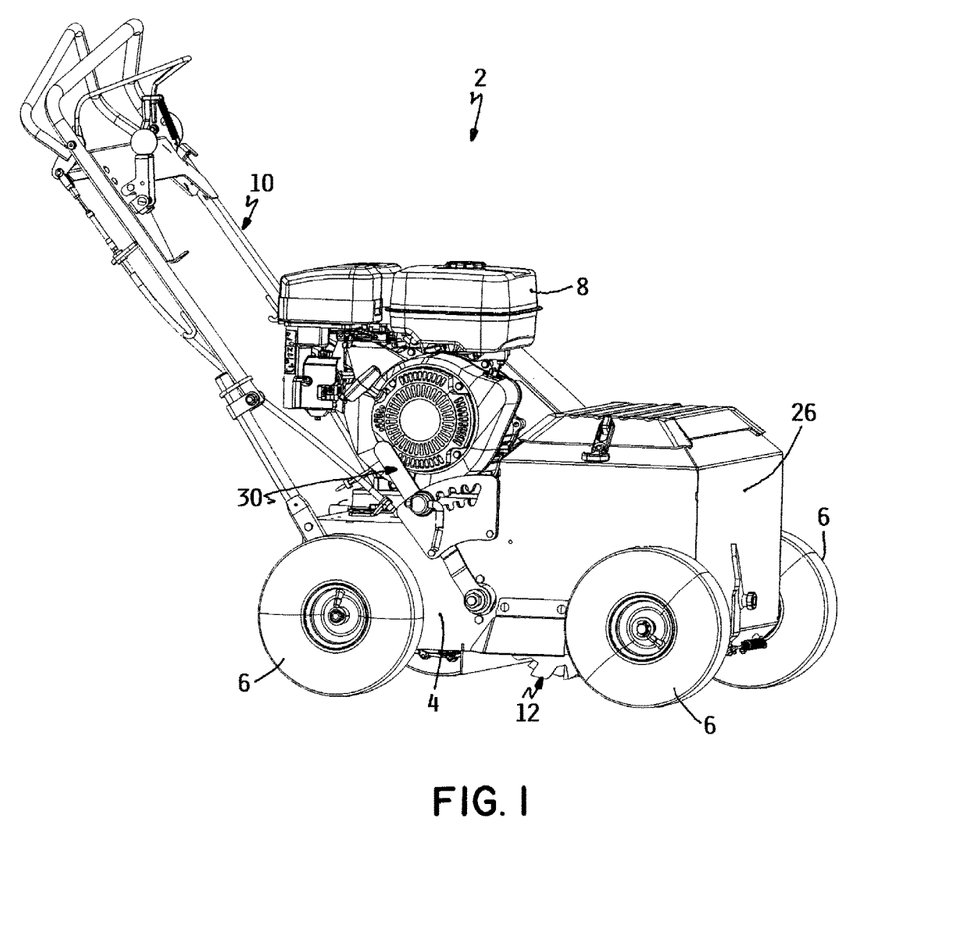
FIG. 1 is a perspective view of one embodiment of a turf implement according to this invention.

Referring first to FIG. 1, one embodiment of a turf implement according to this invention is generally illustrated as 2. Implement 2 includes a frame 4 supported for rolling over the ground by a plurality of wheels 6. A traction drive system (not shown) of any suitable type operatively connects at some of wheels 6 to a power source 8 carried on frame 4, such as but not limited to an internal combustion, gasoline fueled engine, to cause frame 4 to be self-propelled over the turf. A handle assembly 10 extends upwardly and rearwardly from frame 4 to allow an operator who walks on the ground behind frame 4 to guide and operate implement 2. Alternate embodiments can include no traction drive, no handle assembly or forward facing handle assembly, and an implement 2 that can be pushed or towed by some other vehicle.

Figures 2, 7:
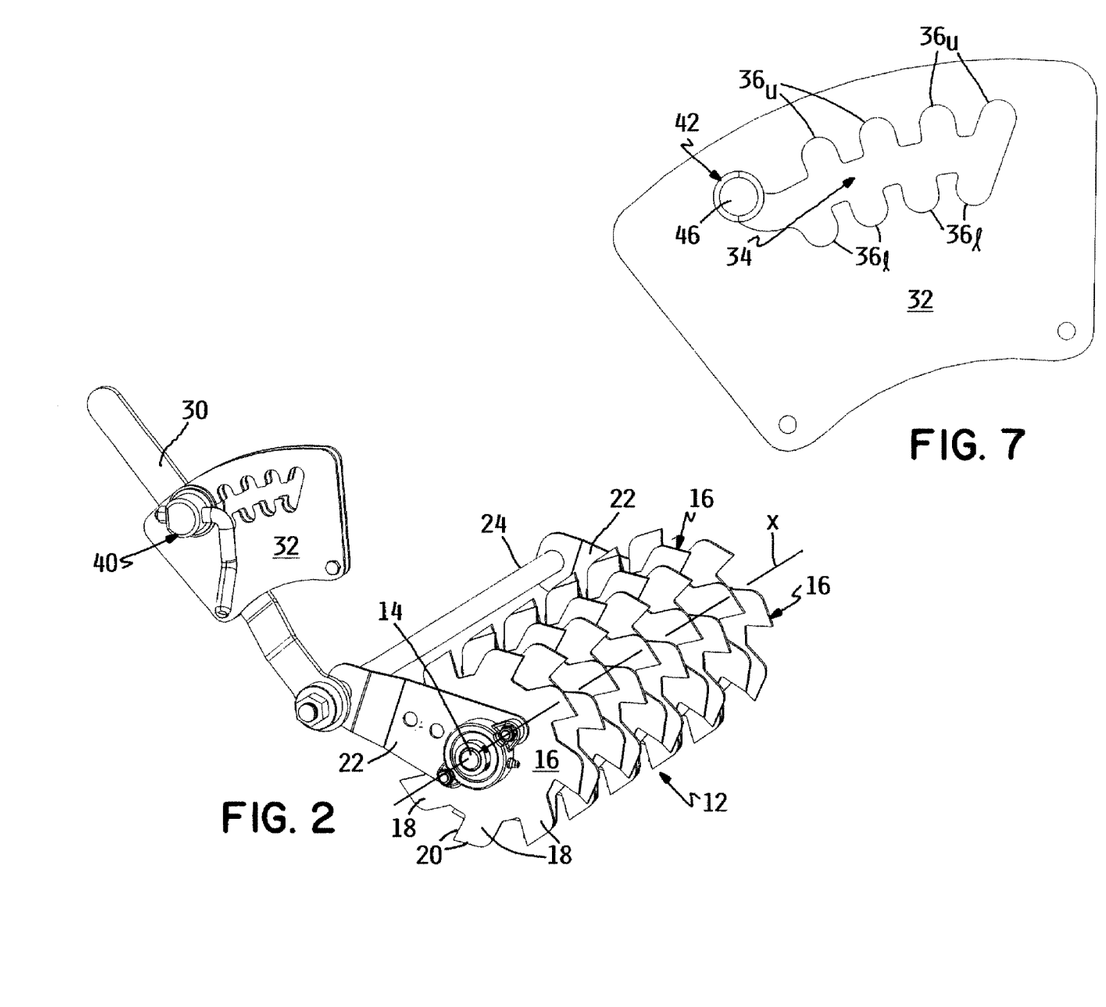
FIG. 2 is a perspective view of a portion of the turf implement of FIG. 1, namely of the turf slicing reel and of the height adjustment mechanism for adjusting the height of the axis of rotation of the slicing reel relative to the turf.
FIG. 7 is a side elevational view of the slot and notch configuration used in the plates of the height adjustment mechanism with the pin being received in one of the upper notches.

Referring now to FIG. 2, implement 2 carries a turf slicing reel 12. Reel 12 includes a laterally extending through shaft 14 that mounts a plurality of cutting blades 16 that are laterally spaced apart along the length of reel shaft 14. Each cutting blade 16 is notched around its periphery to provide a plurality of cutting teeth 18 having cutting edges 20. Alternatively, each cutting blade 16 could comprise a circular disc (not shown) having a single continuous cutting edge extending substantially continuously around the circumference of the disc. In either case, cutting blades 16 are substantially vertically oriented so that cutting edges 20 are disposed in substantially vertical cutting planes so that each cutting blade 16 slits or slices down into the turf when reel 12 is rotated about a substantially horizontal axis of rotation denoted as x. Alternate embodiments for the cutting members can include spring tines, flail blades, etc., in lieu of cutting blades 16.

The ends of reel shaft 14 are rotatably journalled in bearings in the free ends of a pair of yoke arms 22. The other ends of yoke arms 22 are secured to opposite ends of an auxiliary shaft 24 that is parallel to reel shaft 14 with the opposite ends of auxiliary shaft 24 being suitably rotatably journalled in frame 4. Thus, when auxiliary shaft 24 is rotated in opposite directions about its axis, the horizontal rotational axis x of reel 12 is either raised or lowered relative to the turf depending on the direction of rotation of auxiliary shaft 24 due to the offset mounting of reel shaft 14 on auxiliary shaft 24 by virtue of yoke arms 22. One end of reel shaft 14 extends outwardly of the nearest yoke arm 22 to be connected to a drive system, such as a belt drive system (not shown), operatively connecting reel shaft 14 to the power source for powered operation of reel 12. Alternate embodiments can include various other methods or mechanisms to raise and lower reel 12, such as by using height adjustable wheels 6 on frame 4, or to drive reel 12, such as by using a ground drive.

Implement 2 depicts reel 12 herein as part of a product known as a slicer seeder since frame 4 also carries a hopper 26 for carrying a supply for grass seed along with seed dispensing mechanism for dispensing the grass seed in a seeding or overseeding operation. However, the seeder portion of implement 2 is not germane to this invention and could be dispensed with if so desired, with implement 2 being built without any seed carrying hopper 26 or seed dispensing mechanism.

Figure 3:
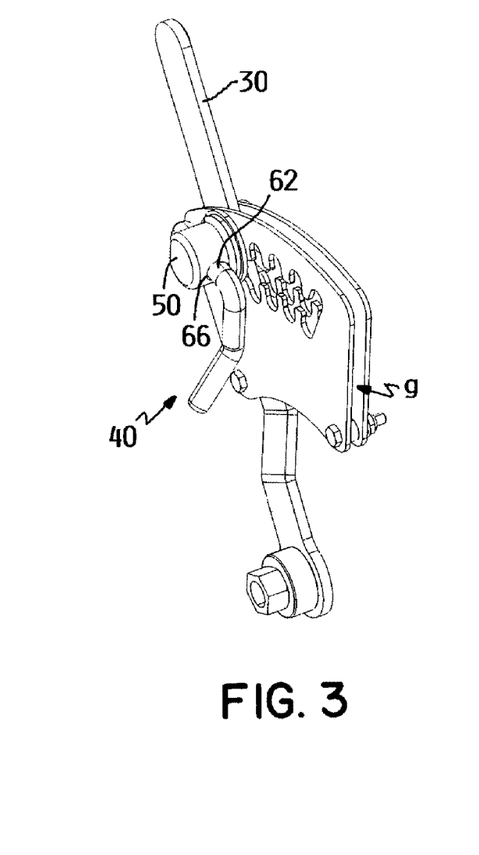
FIG. 3 is a perspective view of a portion of the height adjustment mechanism of FIG. 2, particularly illustrating the pivotal height adjustment lever, the plates containing the height adjustment slots and notches for receiving a pin carried on the height adjustment lever, and the clamp for holding the height adjustment lever and the pin in a desired adjustment position.

A pivotal height adjustment lever 30 is fixedly connected at a lower end thereof to one end of auxiliary shaft 24 and is thus pivotally journalled in frame 4 by virtue of the rotatable journaling of auxiliary shaft 24 in frame 4. Adjustment lever 30 is elongated and extends away from the lower end thereof over some distance with adjustment lever 30 terminating in a free upper end that can serve as a handle for permitting an operator to pivot adjustment lever 30 back and forth in opposite directions. It is this pivoting motion of adjustment lever 30 that rotates auxiliary shaft 24 in opposite directions to cause yoke arms 22 to lift and lower to thereby lift and lower the horizontal rotational axis x of reel 12 relative to the turf. Referring to FIG. 3, a central portion of adjustment lever 30 passes through a narrow gap g formed between two identical plates 32 that are fixed to frame 4 but are laterally spaced apart from one another by a small distance that is sufficient to form gap g. The coaction between adjustment lever 30 and plates 32 is what releasably holds adjustment lever 30 in one of a plurality of different positions corresponding to one of a plurality of different adjusted heights of the horizontal rotational axis x of reel 12 relative to the turf. Alternate embodiments can include a single plate, alternate means to couple reel 12 to adjustment lever 30, and independent left and right adjustment means.

Because plates 32 are identical, a description of one plate 32 serves to describe the other plate 32. Referring now to FIG. 7, each plate 32 includes an elongated slot 34 that extends in an arc from front to back on plate 32 near the top of plate 32. A first set of height adjustment notches 36 extend upwardly from an upper edge of slot 34 and will thus be referred to herein as the upper notches $36_u$. A second set of height adjustment notches 36 extend downwardly from a lower edge of slot 34 and will thus be referred to herein as the lower notches $36_l$. Lower notches $36_l$ are offset slightly in a fore-and-aft direction along the arc of slot 34 relative to upper notches $36_u$ to provide an effective doubling in the number of operational height adjustment positions. When plates 32 are secured together in a way that forms gap g, slot 34 and notches 36 in plates 32 will be aligned with one another.

Upper notches $36_u$ are generally equally spaced apart along the upper edge of slot 34 except for a rearmost upper notch $36_{ur}$ at the rear end of slot 34 which has extra spacing from the nearest upper notch $36_u$ than the spacing used between upper notches $36_u$. The reason for this additional spacing is that rearmost upper notch $36_{ur}$ defines a maximum height position in which reel 12 has been lifted upwardly relative to the turf to help facilitate transport of implement 2 from one location to another location, i.e. from the field to the shop. The smaller spacing between the other upper notches $36_u$ is used since the other upper notches $36_u$ define working or operational positions of reel 12 in which the lower portions of the orbits of cutting edges 20 of cutting blades 16 are actually slicing in some manner into the turf, either above or below the surface of the soil. Each of the other upper notches $36_u$ and each lower notch $36_l$ provides an incrementally different working or operational position of reel 12. Each of the notches represents a defined and discrete position for the reel height for easy and fast reference for resetting the height to a particular desired height.

Figure 4:
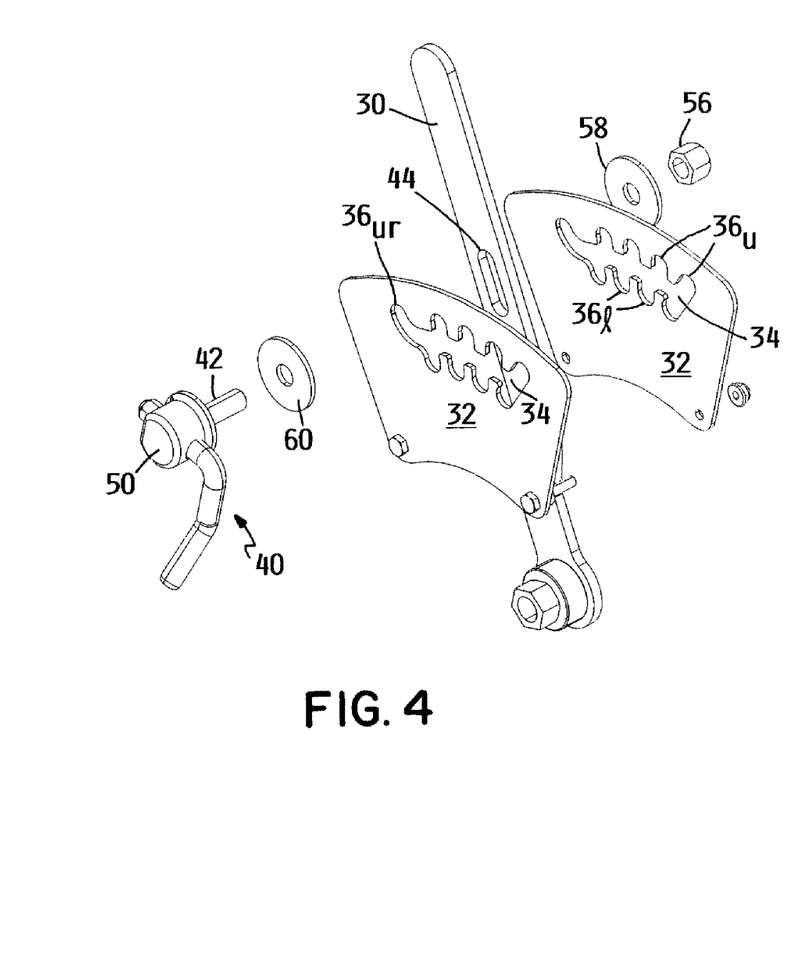
FIG. 4 is a perspective view similar to FIG. 3, but showing the parts in an exploded form to illustrate the pin and the thrust washers of the clamp.
Figure 5:
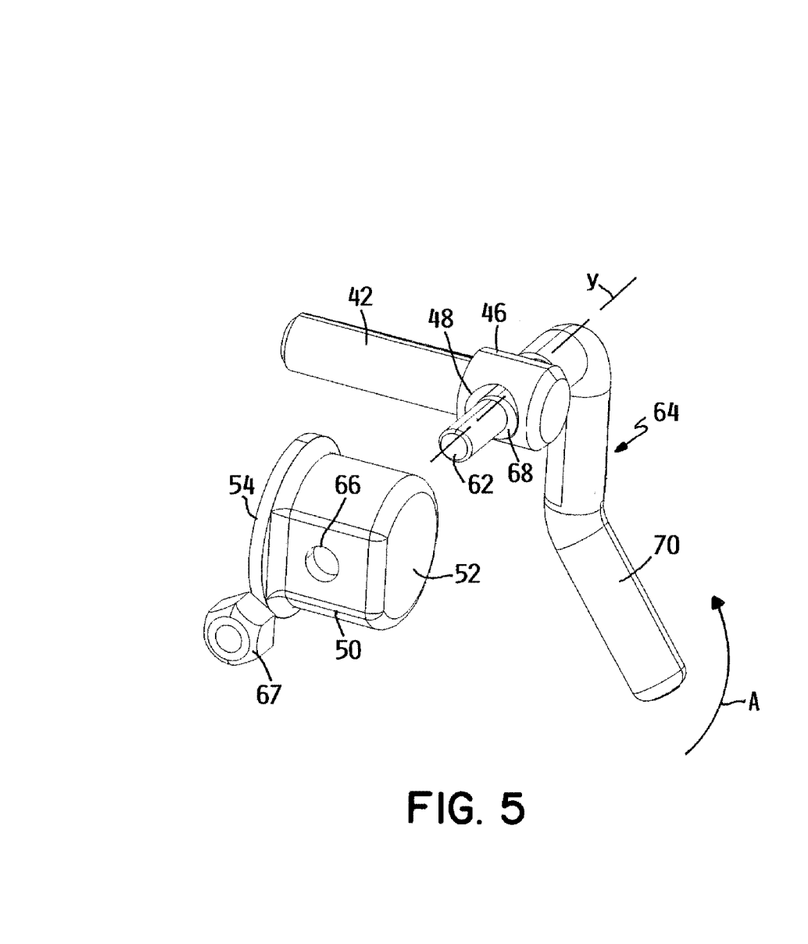
FIG. 5 is a perspective view in an exploded form of a portion of the clamp of the height adjustment mechanism, particularly illustrating the rotatable cam and the rotatable locking lever disposed in a locked position in which the clamp will be placed into a tightly compressed, clamped condition relative to the frame.
Figure 6:
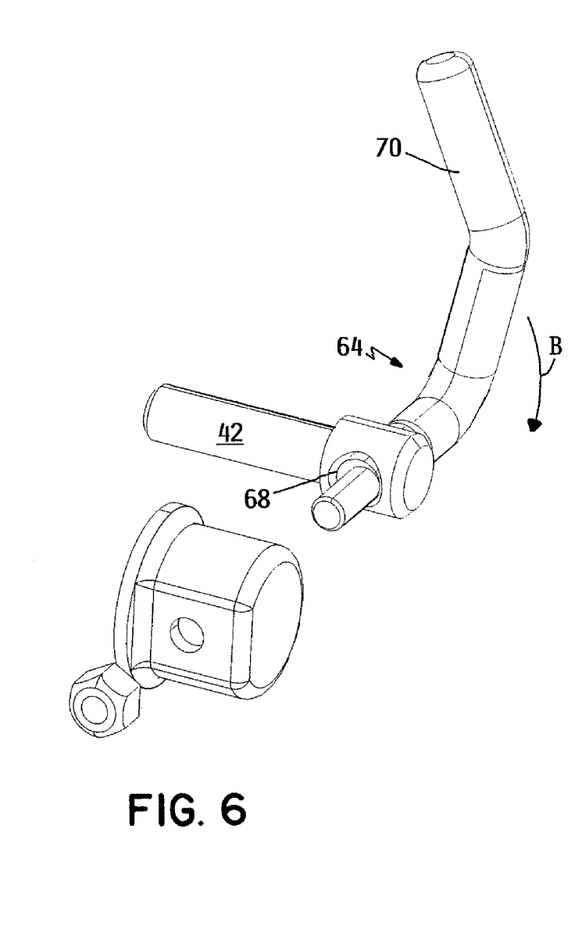
FIG. 6 is a perspective view similar to FIG. 5, but particularly illustrating the rotatable cam and the rotatable locking lever disposed in an unlocked position in which the clamp will be placed into a loosely expanded, unclamped condition relative to the frame.

Turning now to the rest of the height adjustment mechanism and referring to FIGS. 4, 5 and 6, a clamp 40 is provided that includes a laterally extending pin 42 that passes through slot 34 in one plate 32, through an elongated opening 44 in adjustment lever 30, and then through slot 34 in the other plate 32. One end of pin 42 has an enlarged head 46 that includes a cross bore 48 extending therethrough. Head 46 of pin 42 is encased within a hollow circular hub 50 having a closed outer end 52 and an open, inwardly facing inner end 54. The stem of pin 42 extends out through inner end 54 of hub 50 for a distance sufficient to traverse all the way through plates 32 and adjustment lever 30 to terminate in a free end that is threaded to receive a threaded securing nut 56 thereon. A first thrust washer 58 is loosely received around the stem of pin 42 between nut 56 and an exterior or back side of the laterally innermost plate 32. A second thrust washer 60 is loosely received around the stem of pin 42 between the inner end of hub 50 and an exterior or front side of the outermost plate 32.

Pin 42 is held within hub 50 by a shank 62 of a rotatable locking lever 64 that is rotatably journalled in a through bore formed by aligned holes 66 in opposite sides of hub 50 and is held in place in hub 50 by a nut 67 on a threaded free end of shank 62. The axis of rotation of locking lever 64 is indicated as y in FIG. 5. A cam 68 is integrally formed on shank 62 with cam 68 being received inside cross bore 48 in head 46 of pin 42. When locking lever 64 is rotated into a first locked position as shown in FIG. 5, cam 68 is rotated outwardly relative to plates 32 to pull pin 42 into hub 50 to cause clamp 40 to compress tightly into a clamped condition, i.e. nut 56 on the free end of pin 42 will cause thrust washers 58, 60 to tightly grip against the adjacent exterior sides of plates 32. When clamp 40 is in this clamped condition, pin 42 and adjustment lever 30 will be locked or held in place on frame 4 with pin 42 being received in any of the height adjustment notches 36 in which it has been placed by the operator through rotation of adjustment lever 30 and an upward or downward movement of clamp 40 on adjustment lever 30 depending upon whether an upper $36_u$ or lower $36_l$ notch is used.

If a height adjustment operation is to be performed, the operator must first unlock clamp 40. This is done as shown in FIGS. 5 and 6 by rotating an angled hand grip portion 70 of locking lever 64 upwardly in the direction of the arrow A in FIG. 5 through an arc of rotation of approximately 180° until hand grip portion 70 of locking lever 64 extends upwardly as shown in FIG. 6. In this position, cam 68 has been rotated approximately 180° around the rotational axis y as shank 62 rotates around the rotational axis y with the net result being that cam 68 has been displaced laterally inwardly from its position shown in FIG. 5. This displacement of cam 68 pushes inwardly on cross bore 48 of pin 42 to move pin 42 outwardly from hub 50, thus causing nut 56 on the free end of pin 42 to move laterally inwardly away from the exterior or back side of the innermost plate 32. This movement of nut 56 causes clamp 40 to loosely expand into an unclamped position in which thrust washers 58, 60 only loosely rest on or are slightly spaced from the exterior sides of plates 32. In this unclamped position of clamp 40, the operator is now able to pivotally adjust the position of adjustment lever 30 along slot 34. Orientation of hand grip portion 70 for clamping and unclamping motions can be in any rotational position about pin 42.

To set a new height adjusted position on reel 12, the operator needs to grip the top of adjustment lever 30 and pull or push on adjustment lever 30 to slide adjustment lever 30 in one direction or the other within gap g between plates 32 while guiding clamp 40. During such sliding motion, pin 42 is sized to slide substantially freely within slot 34, namely slot 34 is somewhat wider from top to bottom than the outer diameter of pin 42. When adjustment lever 30 reaches a place within slot 34 in which pin 42 is aligned with a desired upper notch $36_u$ or $36_{ur}$ or lower notch $36_l$, the operator can stop moving adjustment lever 30. If an upper notch is selected, the operator lifts up slightly on hub 50 of clamp 40 to move pin 42 up into the selected upper notch. If a lower notch is selected, the operator can push down slightly on hub 50 of clamp 40 to move pin 42 down into the selected lower notch or the operator can let gravity move clamp 40 down into the selected lower notch. This vertical motion of pin 42 and clamp 40 is provided for by virtue of elongated opening 44 in adjustment lever 30 through which pin 42 passes. Once pin 42 is received in the selected upper or lower notch, the operator then grabs and rotates hand grip portion 70 of locking lever 64, using his or her other hand if one hand is supporting hub 50 of clamp 40 in a selected upper notch, in the direction shown by arrow B in FIG. 6. This rotation continues until locking lever 64 rotates downwardly from the raised position of hand grip portion 70 of locking lever 64 to the lowered position of hand grip portion 70 of locking lever 64. This places clamp 40 back into its clamped position and retains adjustment lever 30 and pin 42 in their new adjusted position.

Due to the dual sets of upper $36_u$ and lower $36_l$ notches that are offset relative to one another, the height adjustment mechanism described above provides a sufficient number of height adjustment positions without having to make the notches 36 and pin 42 extremely small as would be the case if all the notches 36 had been in a single arc. Nonetheless, the same pin 42 can access either set of notches $36_u$ or $36_l$ due to the vertical motion provided therefor by elongated opening 44 in adjustment lever 30. Thus, pin 42 and notches $36_u$ and $36_l$ can be generously sized and will be extremely durable. Moreover, the quick release action provided by locking lever 64 of clamp 40 allows the operator to quickly and easily clamp and unclamp adjustment lever 30 relative to frame 4 of implement 2 without having to thread or unthread any nuts. Clamp 40 will also provide a strong and reliable holding force and does not require any springs for maintaining engagement. This helps mitigate vibration, noise, and part wear in the mechanism. Thus, an operator will be able to quickly and easily make a height adjustment of the rotational axis x of reel 12 relative to the turf and quickly and easily lock that height adjustment into place using clamp 40.

Various modifications of this invention will be apparent to those skilled in the art. For example, one or both of the sets of notches could be dispensed with if so desired, though the use of some notches along at least one edge of slot 34 is preferred to provide incrementally known and easily repeatable height adjustments rather than the harder to set infinite adjustments provided by a slot alone. If a slot alone were used, pin 42 and clamp would not have to have any vertical motion along the length of adjustment lever 30 since pin 42 would simply ride within slot 34. One of plates 32 that carry slot 34 and notches could be dispensed with as long as one plate remains. In this case, one of thrust washers 58, 60 would bear directly against a front or back side of adjustment lever 30 when clamp 40 is in its clamped condition.

In addition, the slot 34 and notches 36 could be placed on a portion of adjustment lever 30 with clamp 40 and pin 42 being carried on a portion of frame 4. This is essentially the opposite of the placement disclosed earlier herein. In this alternative, clamp 40 and pin 42 would move up and down in a vertical slot on frame 4 to be able to access either the upper $36_u$ or lower $36_l$ notches of slot 34, such slot and notches now being carried on or formed as a part of adjustment lever 30. Moreover, while notches 36 are deep enough such that pin 42 is substantially fully received in notches 36 when moved into such notches, this is not strictly necessary as long as pin 42 is able to move at least partially out of slot 34 at least partially into each notch 36, e.g. the top or bottom half of pin 42 only is received in notch 36. It should also be apparent that pin 42 could remain entirely within slot 34 without entering a notch 36 at the moment when clamp 40 is placed into its clamped position. This would provide yet more possible adjusted positions for the reel height, albeit not adjusted positions that are formed by one of the precisely located notches 36 whose height control settings or values are known and can be indicated on a decal or markings placed adjacent notches 36.

Accordingly, this invention is not to be limited to the structural details of the embodiment of the invention disclosed herein, but shall be limited only by the appended claims.

The invention claimed is:

1. A turf implement, which comprises:
   (a) a frame supported for movement over the turf;
   (b) a rotatable slicing reel carried on the frame for rotation about a substantially horizontal axis of rotation, the slicing reel having a plurality of laterally spaced cutting members which rotate in substantially vertical cutting planes to slice into the turf for creating slits in the turf or for engaging with and acting on a thatch layer of the turf for dethatching; and
   (c) a height adjustment mechanism for adjusting the height of the slicing reel relative to the turf, the height adjustment mechanism comprising:
      (i) an adjustment member movably carried on the frame, the adjustment member being selectively movable in a first direction on the frame for lifting the slicing reel relative to the turf and being selectively movable in a second opposite direction on the frame for lowering the slicing reel relative to the turf;
      (ii) a slot on one of the frame or the adjustment member;
      (iii) a pin carried on the other of the frame or the adjustment member with the pin projecting into the slot, wherein selective movement of the adjustment member relative to the frame selectively adjusts the height of the slicing reel relative to the turf and changes the location of the pin along the slot; and
      (iv) a clamp carried on the pin for retaining the adjustment member in a desired position relative to the frame corresponding to a desired height of the slicing reel relative to the turf, the clamp including a selectively rotatable cam operatively connected to the pin for moving the pin substantially perpendicularly relative to the slot when the cam is rotated, the cam when selectively rotated in a first direction moving the pin in a first direction relative to the slot that loosens the clamp sufficiently to permit the adjustment member to be moved relative to the frame, the cam when selectively rotated in a second opposite direction moving the pin in an opposite second direction relative to the slot that tightens the clamp sufficiently to prevent the adjustment member from being moved relative to the frame.

2. The implement of claim 1, wherein the slot has a first set of a plurality of notches that are spaced along one edge of the slot, wherein the pin is received at least partially in any one of the notches at any given time to establish a desired height of the slicing reel relative to the turf.

3. The implement of claim 2, wherein the slot has a second set of a plurality of notches spaced along a second edge of the slot that is opposite to the first edge of the slot, the notches in the second set being offset from the notches in the first set to provide adjusted positions for the height of the slicing reel that are between the adjusted positions for the height of the slicing reel that are provided by the notches in the first set to thereby increase the number of possible adjusted positions.

4. The implement of claim 3, wherein the slot is wide enough to accommodate the pin for substantially free sliding motion within the slot with the pin and the slot being displaceable relative to one another in a first direction to move the pin at least partially out of the slot and at least partially into a desired notch in the first set of notches and with the pin and the slot being displaceable relative to one another in a second opposite direction relative to the slot to move the pin at least partially out of the slot and at least partially into a desired notch in the second set of notches.

5. The implement of claim 4, wherein the slot is on the frame and the pin is carried on a portion of the adjustment member, and wherein the portion of the adjustment member carrying the pin includes an elongated opening therein for receiving the pin which elongated opening is sufficiently long to allow the pin and the clamp to be displaced along the adjustment member sufficiently that the pin is able to pass at least partially out of the slot to enter at least partially into a selected notch in either the first set or second set of notches respectively.

6. The implement of claim 4, wherein the adjustment member comprises an elongated adjustment lever that is pivotally carried on the frame.

7. The implement of claim 6, wherein a top of the adjustment lever is capable of being gripped by an operator to permit manual pivoting motion of the adjustment lever.

8. The implement of claim 6, wherein the adjustment lever is operatively coupled to the slicing reel in a manner that adjusts a height of the slicing reel relative to the frame to thereby adjust the height of the slicing reel relative to the turf.

9. The implement of claim 4, wherein the slot and the first and second sets of notches are formed in a first plate on the frame and the pin is carried on a portion of the adjustment member, and wherein a second plate is provided on the frame adjacent to but spaced from the first plate by a gap, the second plate having a slot and first and second sets of notches that are substantially identical to and are aligned with the slot and the first and second sets of notches in the first plate such that the pin projects into the slots on both of the first and second plates and coacts with the first and second sets of notches in the first and second plates in an identical manner when adjusting the height of the slicing reel relative to the turf.

10. The implement of claim 9, wherein the portion of the adjustment member carrying the pin is received in the gap between the first and second plates.

11. The implement of claim 10, wherein the adjustment member comprises an elongated adjustment lever that is pivotally carried on the frame.

12. The implement of claim 9, wherein the clamp has a first thrust surface that engages against a side of the first plate that is exterior to the gap and a second thrust surface that engages against a side of the second plate that is exterior to the gap, the first and second thrust surfaces engaging the exterior sides of the first and second plates with sufficient force when the clamp is tightened by movement of the cam to prevent the pin and the adjustment member from being moved out of an adjusted position.

13. The implement of claim 1, wherein the rotatable cam is carried on a shank portion of a rotatable elongated locking lever having a hand grip portion that is angularly disposed relative to the shank portion, the hand grip portion of the locking lever serving to rotate the shank portion of the locking lever about an axis of elongation of the shank portion to rotate the cam carried on the shank portion as the hand grip portion of the locking lever is selectively pivoted by an operator who grips the hand grip portion and rotates the hand grip portion through a selected arc.

14. A turf implement, which comprises:
(a) a frame that carries a rotatable turf slicing reel;
(b) a height adjustment member that moves in opposite directions on the frame to raise and lower the slicing reel relative to the turf;
(c) a slot on one of the frame or the adjustment member with the slot having a plurality of spaced notches;
(d) a pin carried on the other of the frame or the adjustment member with the pin being received in the slot and in any one of the notches to provide a desired adjusted position for the slicing reel height; and
(e) a clamp having a quick release locking lever that is selectively rotated between a locked position in which the clamp is in a tightly compressed condition to hold the adjustment member in the desired adjusted position and an unlocked position in which the clamp is in a loosely expanded condition to permit the adjustment member to be moved to change the desired adjusted position, the locking lever being movable between the locked and unlocked positions thereof by rotating the locking lever through an arc that is less than 360°, a cam portion of the locking lever passing through a bore in the pin with the locking lever rotating about an axis of rotation that is perpendicular to an axis of elongation of the pin for moving the pin perpendicularly in opposite directions along the axis of elongation of the pin to cause the clamp to be placed into the tightly compressed and loosely expanded conditions thereof.

15. A turf implement, which comprises:
(a) a frame that carries a rotatable turf slicing reel;
(b) a height adjustment member that moves in opposite directions on the frame to raise and lower the slicing reel relative to the turf;
(c) a slot on the frame, wherein the slot has a first set of a plurality of notches that are spaced along one edge of the slot to provide a first plurality of adjusted positions for the height of the slicing reel relative to the turf, wherein the slot has a second set of a plurality of notches spaced along a second edge of the slot that is opposite to the first edge of the slot, the notches in the second set being offset from the notches in the first set to provide a second plurality of adjusted positions for the height of the slicing reel that are between the adjusted positions that are provided by the notches in the first set to thereby increase the number of possible adjusted positions;
(d) a pin carried on the adjustment member with the pin being received in the slot and at least partially in any one of the notches to provide a desired adjusted position for the slicing reel height, wherein the pin is movably carried in an elongated opening in the adjustment member to be movable relative to the adjustment member, the pin being displaceable within the elongated opening relative to the adjustment member in a first direction to move the pin at least partially out of the slot and at least partially into a desired notch in the first set of notches and with the pin being displaceable within the elongated opening relative to the adjustment member in a second opposite direction relative to the slot to move the pin at least partially out of the slot and at least partially into a desired notch in the second set of notches; and (e) a clamp coacting between the frame and the adjustment member with the clamp having a tightly compressed condition to hold the adjustment member in a position corresponding to a desired adjusted position of the slicing reel height and an unlocked position in which the clamp is in a loosely expanded condition to permit the adjustment member to be moved to change the desired adjusted position of the slicing reel height, wherein the clamp is carried by the pin and remains on the pin as the pin is displaced within the elongated opening of the adjustment member.

16. The implement of claim 15, wherein the clamp includes a selectively rotatable cam, the cam when selectively rotated in a first direction loosening the clamp sufficiently to permit the adjustment member to be moved relative to the frame, the cam when selectively rotated in a second opposite direction tightening the clamp sufficiently to prevent the adjustment member from being moved relative to the frame.

17. The implement of claim 16, wherein the rotatable cam is carried on a shank portion of a rotatable elongated locking lever having a hand grip portion that is angularly disposed relative to the shank portion, the hand grip portion of the locking lever serving to rotate the shank portion of the locking lever about an axis of elongation of the shank portion to rotate the cam carried on the shank portion as the hand grip portion of the locking lever is selectively pivoted by an operator who grips the hand grip portion and rotates the hand grip portion through a selected arc.

18. The implement of claim 17, wherein the cam is operatively connected to the pin for moving the pin in a first direction relative to the slot to loosen the clamp and for moving the pin in a second opposite direction relative to the slot to tighten the clamp.

19. The implement of claim 15, wherein the slot and the first and second sets of notches are formed in a first plate on the frame, and wherein a second plate is provided on the frame adjacent to but spaced from the first plate by a gap, the second plate having a slot and first and second sets of notches that are substantially identical to and are aligned with the slot and the first and second sets of notches in the first plate such that the pin projects into the slots on both of the first and second plates and coacts with the first and second sets of notches in the first and second plates in an identical manner when adjusting the height of the slicing reel relative to the turf.

* * * * *